United States Patent [19]

Schwartz, Jr.

[11] 4,038,341
[45] July 26, 1977

[54] LOW PROFILE ADDITIVES IN POLYESTER SYSTEMS

[75] Inventor: Willis T. Schwartz, Jr., Grand Island, N.Y.

[73] Assignee: Hooker Chemicals & Plastics Corporation, Niagara Falls, N.Y.

[21] Appl. No.: 665,751

[22] Filed: Mar. 11, 1976

[51] Int. Cl.$^2$ .............................................. C08L 67/06
[52] U.S. Cl. ................... 260/862; 260/40 R; 260/42.18; 260/42.53; 260/873; 526/15
[58] Field of Search ............... 260/40 R, 47, 862, 873; 526/15

[56] References Cited

U.S. PATENT DOCUMENTS

| | | | |
|---|---|---|---|
| 3,413,379 | 11/1968 | Shade et al. | 260/860 |
| 3,446,778 | 5/1969 | Waller et al. | 260/75 |
| 3,466,348 | 9/1969 | Wiener | 260/860 |
| 3,528,939 | 9/1970 | Pratt et al. | 526/15 X |
| 3,598,882 | 8/1971 | Brinkmann et al. | 260/873 |
| 3,642,726 | 2/1972 | Heilman | 526/15 X |
| 3,660,339 | 5/1972 | Schuh | 526/15 X |
| 3,705,208 | 12/1972 | Nakamuta et al. | 260/873 X |
| 3,718,714 | 2/1973 | Comstock | 260/862 |
| 3,733,370 | 5/1973 | Thompson et al. | 260/862 |
| 3,741,943 | 6/1973 | Sekmakas | 526/15 X |
| 3,810,863 | 5/1974 | Hatton et al. | 260/40 R |
| 3,857,812 | 12/1974 | Nowak et al. | 260/40 R |
| 3,862,998 | 1/1975 | Koehler et al. | 260/873 |
| 3,880,950 | 4/1975 | Hara et al. | 260/862 |
| 3,883,612 | 5/1975 | Pratt et al. | 260/862 |
| 3,887,515 | 6/1975 | Pennington et al. | 260/862 X |
| 3,917,573 | 11/1975 | Parekh et al. | 526/15 |
| 3,925,328 | 12/1975 | Shibahara et al. | 526/15 |
| 3,947,422 | 3/1976 | Tatum et al. | 260/862 X |
| 3,956,421 | 5/1976 | Roberts et al. | 260/862 |
| 3,966,842 | 6/1976 | Ludwig et al. | 260/873 |
| 3,980,610 | 9/1976 | Conard | 260/40 R |
| 3,986,992 | 10/1976 | Canning et al. | 260/862 X |

OTHER PUBLICATIONS

Chem. Abs. 82:P87075t.

Primary Examiner—John C. Bleutge
Assistant Examiner—T. DeBenedictis, Sr.
Attorney, Agent, or Firm—Peter F. Casella; James F. Mudd; William G. Gosz

[57] ABSTRACT

Polymerizable polyester molding compositions having good shrinkage control comprise (1) a polymerizable polyester, and (2) a low profile additive comprising the reaction product of a styrene-maleic anhydride copolymer and a polydiene having terminal hydroxyl groups.

11 Claims, No Drawings

LOW PROFILE ADDITIVES IN POLYESTER SYSTEMS

BACKGROUND OF THE INVENTION

The present invention relates to improvements in the art of preparing moldable reinforced polyesters characterized by being tack free, and by little or no tendency towards shrinkage during the curing thereof.

For many years polyester resins based on an unsaturated polyester and an unsaturated monomer, such as styrene, have been used in the preparation of molding compositions. When formulated in a known manner with appropriate adjuvants such as fillers, pigments, curing agents, reinforcing agents, and the like, such polyester-based molding compositions may be used in conventional molding processes such as sheet molding or bulk molding to prepare a wide variety of materials or articles which are generally characterized by high strength, light weight and excellent chemical resistance. However, articles fabricated from such molding compositions by conventional molding techniques commonly exhibit poor dimensional stability, due in a large part to shrinkage during the molding process. Thus, considerable difficulties are encountered in the production of molded articles where close size and shape tolerance limits are required since in many instances an inordinate amount of labor is required after removal of a part from the mold to shape it to the exact finish, size or shape required for a given application.

Considerable effort has been expended in recent years, in the development of dimensionally stable, low profile polyester molding compositions. It is now well known to those skilled in the art that with the addition of thermoplastic polymers to polyester systems, such as polyester-styrene based resins, there may be prepared compositions which, when formulated with the appropriate adjuvants to form molding compounds, display minimal shrinkage or expansion during the molding process and may be formed with smooth surfaces (low profile). The thermoplastic polymers which have been used for this purpose include, for example, such materials as polyvinyl acetate, cellulose acetate, cellulose butyrate, polymethyl methacrylate, polystyrene, polyethylene, polyvinyl chloride and saturated polyesters.

With the advent of low-profile unsaturated polyester systems, molding techniques have been increasingly employed in the fabrication of automotive parts such as hood scoops, finder extensions and a wide variety of other parts which require both a smooth surface and close adherence to the size and shape of a precision machined mold.

Accordingly, it is an object of the present invention to provide polyester based molding compositions which exhibit a high degree of dimensional stability. It is further object to provide low-profile additive compositions which may be added to polyester based molding compositions to impart a high degree of dimensional stability thereto. It is an additional object to provide articles of manufacture molded from novel polymeric compositions and closely reproducible in size and shape. Other objects and advantages of this invention will be apparent from the following description of the present invention.

SUMMARY OF THE INVENTION

In accordance with the present invention, it has been found that new curable or polymerizable polyester compositions are obtained by admixing components comprising:

1. a polymerizable polyester component; and
2. a low profile additive component comprising the reaction product of a styrene-maleic anhydride copolymer, and a polydiene containing at least one terminal hydroxyl group.

The low profile additive component is present in the amount of at least about 5 parts by weight of said composition comprising the polymerizable polyester component and the low profile additive component, preferably from about 10 to about 20 parts by weight.

The low profile polyester compositions of this invention are characterized by dimensional stability and by little or no shrinkage during molding and curing.

The present invention may be considered in terms of three major aspects thereof:

a. novel low profile additives which may be incorporated into polyester molding compositions to impart dimensional stability thereto.

b. polyester molding compositions containing the novel low profile additives; and c. molded articles of manufacture prepared therefrom.

Although the polyester molding compositions are described in terms of major components thereof, that is the polymerizable polyester component and the additive component, it will be appreciated that, in accordance with known practice, the molding composition may also include additional appropriate ingredients including, for example, filler, lubricants, pigments, fire retardants, curing agents, reinforcing agents, mold release agents, and the like.

DESCRIPTION OF THE PREFERRED EMBODIMENTS

The polymerizable polyester component of the molding compositions of this invention comprises a polymerizable polyester component, and more specifically an unsaturated polyester and a copolymerizable monomer.

The unsaturated polyesters which may be employed include those commonly known in the art, and are generally the reaction product of a polycarboxylic compound and a polyhydric alcohol. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydrides can include maleic, fumaric, chloromaleic, ethyl-maleic, itaconic, citraconic, zeronic, pyrocinchoninic, mesaconic, aconitic and acetylene dicarboxylic, and the like, either along or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ether, allyl or vinyl pentaerythritol ethers and the like, and mixtures thereof.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromoetetrhydrophthalic, chlorendic, adipic, succinic, dichlorosuccinic, and the like, and mixtures thereof.

Suitable saturated polyhydric alcohols for use in the preparation of the polyester resins include ethylene glycol, diethylene, glycol, propylene glycol, dipropylene glycol, butane diol, pentane diol, hexane diol, dibromoneopentyl glycol, 1,4-cylcohexane dimethanol, glycerol, mannitol, sorbitol, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compounds are 2,2-dichloro-ethanol; 1,1-dibromo-2-propanol; 2,2,2-tribromoethanol; 1,1,3,3-tetrabromo-2-propanol; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and an unsaturated alcohol.

The temperature for the reaction between polyhydric alcohols and polybasic acids ranges from about one hundred to two hundred degrees centigrade, although higher or lower temperatures can be used. Esterification catalysts such as para-toluene sulfonic acid, benzene sulfonic acid, betanaphthalene sulfonic acid and the like, or amines such as pyridine, triethyl amine, quinoline and the like can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

The aforementioned polyesters and components thereof are intended to be illustrative of polyesters suitable for the compositions of this invention and are not intended to be all-inclusive. The molecular weight of the polymerizable polyester is not critical and may vary over a wide range. Typically, the average molecular weight will be in a range of from about 500 or less to about 10,000 or higher and preferably from about 700 to about 6000.

A variety of ethylenically unsaturated monomers can be used for curing or cross-linking the ethylenically unsaturated polyesters. The monomer is preferably liquid at reaction temperatures, has the ability to dissolve the unsaturated polyester and is copolymerizable therewith to form a cross-linked structure. Suitable monomers are generally characterized by the presence of at least one reactive $H_2C=C<$ group per molecule. Specific examples of such monomers include styrene, chlorostyrenes, methyl styrenes such as alpha methyl styrene, p-methyl styrene, vinyl benzyl chloride, divinylbenzene, indene, fluorostyrene, unsaturated esters such as methyl acrylate, methyl methacrylate, as well as other lower aliphatic esters of acrylic and methacrylic acids, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, ethylene glycol diacrylate, ethylene glycol dimethacrylate, ethylene glycol diethacrylate and the like, and mixtures thereof.

The proportion of unsaturated monomer to polyester can vary within the ultimate limits of each as necessary to produce an infusible, insoluble polyester resin. Generally the weight proportion of unsaturated monomer: polyester will be between about 0.1 and 0.9 and preferably between about 0.25 and 0.75.

Polymerization catalysts are preferably added to the mixture of polyester and unsaturated monomer to effect setting or curing. Catalysts such as benzoyl peroxide, acetyl peroxide, acetyl peroxide lauroze peroxide, methylethyl ketone peroxide, cumene hydroperoxide, and the like are satisfactory. Such catalysts are commonly used in proportions of about 0.01 to 10 weight percent of the resin, depending on the efficiency of their action and whether or not substances which inhibit polymerization are present in the mixture. The polymerization reaction can also be hastened by addition of promotors such as metals or metal salts, cobalt resinates, cobalt meleate, cobalt naphthenate, and the like, or amines, such as dibutylamine, or mercaptans such as dodecyl mercaptan. These are generally used in proportions similar to or smaller than that stated for the catalysts.

For convenience in handling and mixing, a portion of the monomer may be combined with the polyester, to serve as a solvent therefor prior to the addition of the low profile additive or other compounding ingredients and the remainder of the monomer may then be added during the formulation of the molding compound. To prevent premature polymerization during the initial mixing of the polyester and a portion of the monomer, a polymerization inhibitor is advantageously added to the mixture or to one of its components prior to mixing, especially if the polyester-monomer solution is to be stored or shipped in commerce prior to final compounding or molding and curing. Polymerization inhibitors are generally added in amounts of about 0.001 to 1 weight percent of the mixture. Among the inhibitors which may be advantageously employed to prevent premature polymerization of the mixtures of polyester and monomer are substances such as hydroquinone, benzoquinone, para-tertiarybutyl catechol, para-phenylene diamine, trinitrobenzene, picric acid and the like.

The additive component of the present invention comprises a styrenemaleic anhydride copolymer reacted with a polydienediol.

The styrene-maleic anhydride copolymer employed is a thermoplastic polymer which is commonly known in the art and is commercially available. The copolymer can vary in molecular weight over a wide range and in the proportions of styrene and maleic anhydride which comprise it.

Generally, the styrene-maleic anhydride copolymer can be prepared by reacting maleic anhydride with styrene at elevated temperatures, preferably in the presence of the peroxide catalyst. See, for example, U.S. Pat. No. 2,971,939, which is incorporated herein by reference.

The molar ratio of styrene to maleic anhydride present in the polymer can vary over a wide range. It is preferred to utilize styrene-maleic anhydride copolymers wherein the molar ratio of styrene to maleic anhydride is on the order of about 1:1, 2:1, or 3:1, respectively. However, it should be understood that the copolymer can contain somewhat lower amounts of styrene or higher amounts thereof. Furthermore, it should be understood that when the term "styrene-maleic anhydride copolymer" is used herein and in the claims, it includes within its meaning copolymers that contain substituents on the benzene ring or the alkenyl portions of the styrene, and also polymers which in the polymeric chain small amounts of other materials such as, for example, alpha-methyl styrene. It should also be appreciated that mixtures of different styrene-maleic anhydride copolymers may be used in the compositions within the scope of this invention.

The stryene-maleic anhydride copolymer should have a molecular weight within the preferred range of from about 2,000 to about 20,000. Preferably, the styrene-maleic anhydride copolymer comprises from about 25 parts by weight to about 50 parts by weight per 100 parts by weight of additive.

The hydroxyl-terminated polydiene component of this invention is a polymer or copolymer of a conjugated diene prepared by polymerization of one or more conjugated dienes such as 1,3-butadiene, 2-chloro-1, 3-butadiene, 1,3-pentadiene, isoprene and the like or copolymerization of one or more of such conjugated dienes with one or more unsaturated monomers such as styrene, acrylonitrile, isobutylene and the like. The hydroxyl moiety of the polydiene is located in the terminal position. The preferred hydroxyl-terminated polydienes are polydienediols of the 1,2-isomeric form, that is, those having predominently pendant vinyl groups on alternate carbon atoms of the carbon chain, constituting at least about 60 percent of the olefinic unsaturation present and having a molecular weight in the range of about 500 to about 3000 and most preferably about 700 to about 1500. The preferred polydienediol is hydroxyl terminated 1,2-polybutadiene. The 1,2-polydienes may be prepared in a known manner, for example by anionic polymerization of a conjugated diene, such as 1,3-butadiene, in the presence of an alkali metal, such as lithium or sodium dispersed with the diene in a polar solvent. Terminal hydroxyl groups may be introduced onto the polydiene by known methods, for example by reaction with ethylene oxide which is capable of forming hydroxyl groups during polymerization.

The preparation of the polydienediol component is more fully described in U.S. Pat. No. 3,431,235, to Lubowitz, which is incorporated herein by reference.

The hydroxyl-terminated polydiene is then reacted with the styrene-maleic anhydride copolymer to form the novel low profile additives of this invention. The procedure is described in Example 2.

It has been found that the low profile additives of this invention, when used in admixture with the polymerizable polyester, provide, superior molding compositions which are non-tacky and exhibit increased thickening response in the uncured state, and provide molded articles which exhibit superior surface smoothness, improved hardness, and low shrinkage to provide low profile articles. The low profile additive component of the instant invention can also be co-reacted with the polymerizable polyester component to form a single component polyester system.

Preferably, and especially when the compositions of this invention are to be used for the preparation of sheet moldings compounds, a thickening agent is included. Preferred thickening agents are inorganic compounds known in this art and typical examples include magnesium oxide, calcium oxide, calcium hydroxide, magnesium hydroxide, basic magnesium carbonate and mixtures thereof. Only relatively small amounts of these agents are relatively small amounts of these agents are used; for example, from about one half to about 15 parts by weight and preferably from 1 to about 7 parts by weight based on the weight of the mixture of polyester, monomer, and additive. Greater or lesser amounts may be used depending upon the degree of thickening desired.

The polymerizable composition prepared in accordance with this invention contains additional components which are generally conventional in the art of reinforced plastics. Thus, fillers such as hydrated aluminum oxide, talcum, clays, chalk, asbestos powder and fibers, quartz powder, kieselguhr, and the like, mold lubricants or mold release agents such as calcium and zinc stearate, silicones, and the like, reinforcing materials such as glass fibers, threads and mats, metals fibers, and the like and various mixtures thereof are incorporated by known means in the mixture.

Thus, the mixture of polyester, copolymerizable monomer, low profile additive, thickening agent, filler, mold lubricant and catalyst is blended in suitable apparatus, such as a Cowles Dispersator. The resultant liquid mixture is applied by means of a doctor blade to two sheets of polyethylene film and the glass fibers are uniformly deposited on the resin mixture of one of the films and covered with the resin coated side of the other film. After covering the mass, the polyethylene film sandwich is squeezed between corrugated rolls so as to wet the glass fibers with the resin mixture followed by squeezing between smooth rolls. The resultant sheet molding composition is then rolled on a fiber board core and sealed with aluminum foil backed cellophane film to prevent loss by evaporation of monomer. After aging for a sufficient period, e.g., about two or more days at ambient temperature or above, to permit thickening of the mass, the resulting sheet molding compound can be cut into pieces of desired size, the polyethylene film peeled off and molded in a compression press in a known manner.

Alternatively, the liquid mixture from the Cowles Dispersator can be blended with glass fiber in a premix mixer, and the filled reinforced mixture can be molded directly in a suitable press as a "bulk molding compound". If desired, the molding composition can be extruded through a suitable die as a rod, the extruded rod may be cut into pellets or chips of a desired size and the pellets or chips transferred to a suitable molding press and heated therein under compression to cure the compositions.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1

Preparation of Unsaturated Polyester

A mixture of 790 parts (10.4 mols) of propylene glycol, 882 parts (9.0 mols) of maleic anhydride and 148 parts (1.0 mol) of phthalic anhydride was heated to and maintained at 200°-210° while agitating the mixture and while passing a slow steady stream of nitrogen gas through the mixture. After about 170 parts of water had distilled from the reaction mixture and the acid number of the mass had fallen to 30 to 35, the heating was discontinued. Following the addition of 0.48 part of toluhydroquinone, the polyester mass was cooled to about 120° and 810 parts (7.8 mols) of styrene were dissolved in the mass. The resulting solution had a Brookfield viscosity of 790 cps at 25°.

EXAMPLE 2

Preparation of Low Profile Additive 40.7 grams of a styrene-maleic anhydride copolymer (styrene/maleic anhydride ratio of 3:1), having an average molecular weight of 5500 and an acid number of 278, and 71.0 grams of an hydroxyl-terminated 1,2-polybutadiene (m.w. of 1420 and a vinyl content of 91.5%) were charged to a flask equipped with a stirrer and thermometer. The flask was heated to 150° Centigrade in an oil bath with a nitrogen purge for about 24 hours. The heat was removed and 193.2 grams of styrene and 0.03 grams of toluhydroquinone were added.

EXAMPLE 3

Preparation of Bulk Molding Compound 101.3 parts of the composition of Example 1,25.0 parts of the composition of Example 2,55.5 parts of styrene, 1.85 parts of t-butyl perbenzoate, 5.6 parts of zinc stearate, 369 parts of camelwite, and 2.67 parts of Mg (OH)$_2$ were compounded with a Cowles type stirred on a drill press at medium speed. To the resultant mixture was added 141 parts of ¼ inch chopped glass fiber and mixed with a single curve blade premix mixer.

The resulting bulk molding compound was compression molded for two minutes at 300° F and 1000 p.s.i. The molded piece had the following properties:

| Shrinkage | |
|---|---|
| Parallel to rib | 0.25 mils/in. |
| Perpendicular to rib | −0.13 mils/in. (expansion) |
| Profile | |
| Center | 537 micro inches/½ inch |
| Over ⅜" rib | 550 micro inches/½ inch |
| Barcol Hardness | 59 |

The foregoing embodiments are intended to illustrate the invention but not to limit it. Various modifications can be made in the invention without departing from the spirit and scope thereof.

What is claimed is:

1. A polymerizable molding composition comprising:
   1. a polymerizable polyester component; comprising an unsaturated polyester and a copolymerizable unsaturated monomer and
   2. an additive component comprising the reaction product of a styrene-maleic anhydride copolymer, and a hydroxyl-terminated polydiene.

2. The molding composition of claim 1 wherein the styrene-maleic anhydride copolymer is present in the amount of from about 25 to about 50 parts by weight per 100 parts by weight of additive.

3. The molding composition of claim 1 wherein the hydroxyl-terminated polydiene is a polydienediol having a molecular weight of from about 500 to about 3,000.

4. The molding composition of claim 1 which additionally comprises a thickening agent.

5. The molding composition of claim 4 wherein the thickening agent is an inorganic materal selected from the group consisting of magnesium oxide, magnesium hydroxide, basic magnesium carbonate, calcium hydroxide, and mixtures thereof.

6. The molding composition of claim 1 wherein the hydroxyl-terminated polydiene has at least about 60 percent of the olefinic unsaturation present in the form of 1,2-type of unsaturation.

7. The molding compound of claim 6 wherein the hydroxyl-terminated polydiene is an hydroxyl-terminated 1,2-polybutadiene.

8. The molding composition of claim 1 wherein the styrene-maleic anhydride copolymer has a styrene/maleic anhydride molar ratio of about 3:1.

9. The molding composition of claim 1 wherein the additive is present in the amount of from about 10 to about 20 parts by weight per 100 parts by weight of said molding composition.

10. A thickened non-tacky sheet molding compound comprising a polymerizable molding composition as defined in claim 1 including a filler, a thickening agent, a catalyst, and reinforcing glass fibers.

11. The molding composition of claim 1 wherein the additive component is co-reacted with the polymerizable polyester component.

* * * * *